Feb. 24, 1925.
W. J. GROTENHUIS
BRACKET FOR VEHICLE REAR BUMPERS
Filed June 30, 1924
1,527,184
2 Sheets-Sheet 1
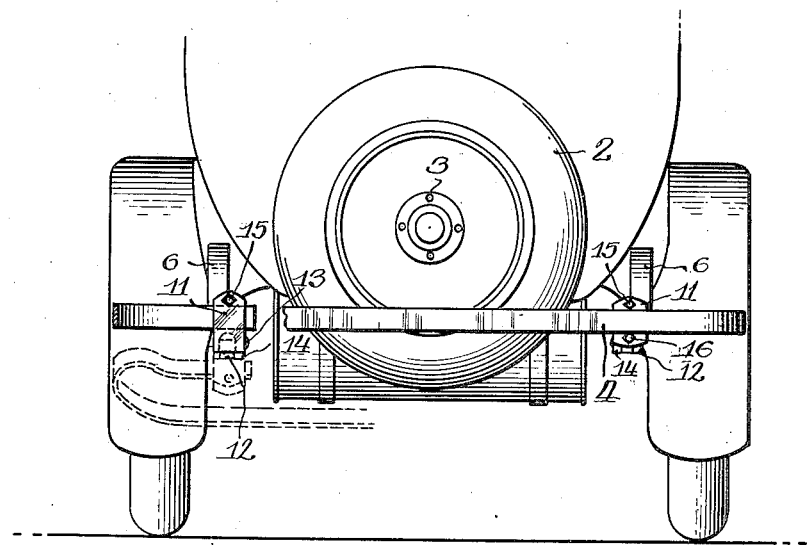
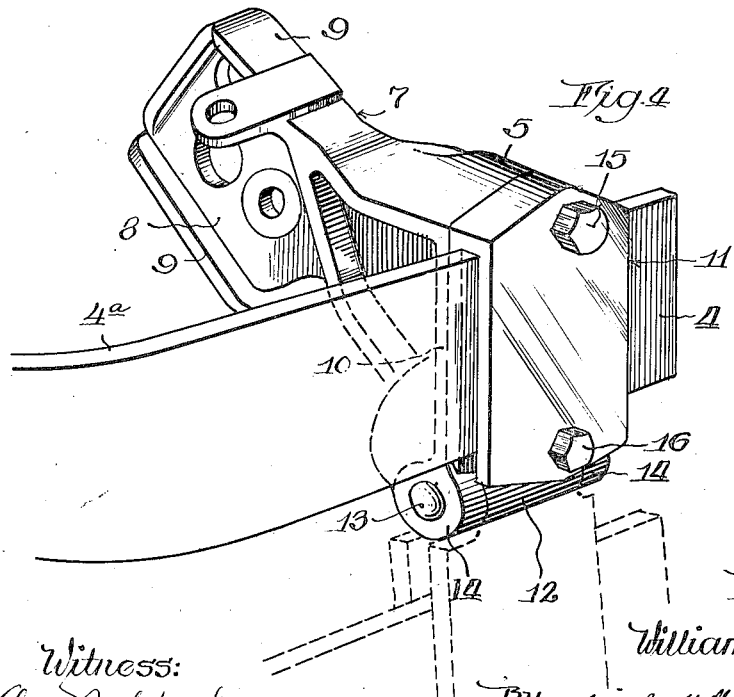
Inventor,
William J. Grotenhuis, Feb. 24, 1925.

W. J. GROTENHUIS 1,527,184

BRACKET FOR VEHICLE REAR BUMPERS

Filed June 30, 1924 2 Sheets-Sheet 2

Witness:
Chas. R. Koursh.

Inventor,
William J. Grotenhuis,
By Offield Melville Scott Hook
Attys.

Patented Feb. 24, 1925.

1,527,184

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF DELAWARE.

BRACKET FOR VEHICLE REAR BUMPERS.

Application filed June 30, 1924. Serial No. 723,111.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Brackets for Vehicle Rear Bumpers, of which the following is a specification.

This invention relates to improvements in brackets for attaching bumpers to motor vehicles and particularly to a bracket especially designed for rear bumpers and calculated to overcome the difficulty that attends the mounting of bumpers at the rear end of a great many makes of vehicles, especially those that provide for mounting a spare wheel or tire on a carrier projecting from the rear.

This difficulty will be appreciated when it is explained that a spare wheel for instance, projects a considerable distance beyond the body and that the bumper to properly afford protection should extend across the wheel and at the same time be spaced far enough from it, not only to allow sufficient give for the bumper so that it will not be driven against the wheel in case of collision, but to offer sufficient space to permit the wheel to be removed when it is needed. A great many spare wheels are carried on a hub-like support, not unlike the wheel spindle which the spare wheel is designed to fit, and in order to remove the wheel it must be drawn directly from the support for some distance in order to clear the end of the hub. This method of removal is illustrated in Figure 2, by the dotted outline of a wheel. If the bumper is close to the wheel the removal is practically impossible. The same is true of spare tires, although some types of carriers permit the removal within a comparatively small space. Heretofore it has been necessary to design bumpers so that there is at least from six to eight inches between the wheel and the bumper in order to provide sufficient space in which to manipulate the wheel, with the result that the bumper actually projects from the rear of the vehicle anywhere from twelve to eighteen inches. This is objectionable since it unnecessarily lengthens the vehicle, increases the difficulty of handling in traffic and close quarters and increases the likelihood of striking objects or persons in turning corners or negotiating doorways and the like.

The object of the present invention is to provide a bracket that will overcome all of these objections as will be presently disclosed.

A preferred embodiment of the invention is illustrated in the accompanying drawings in which, Figure 1 is a view in rear elevation of a vehicle with a bumper attached and shown in normal position and in dropped position for removing the spare wheel.

Figure 4 is a perspective view of a single bracket showing its construction and action.

Figure 2:
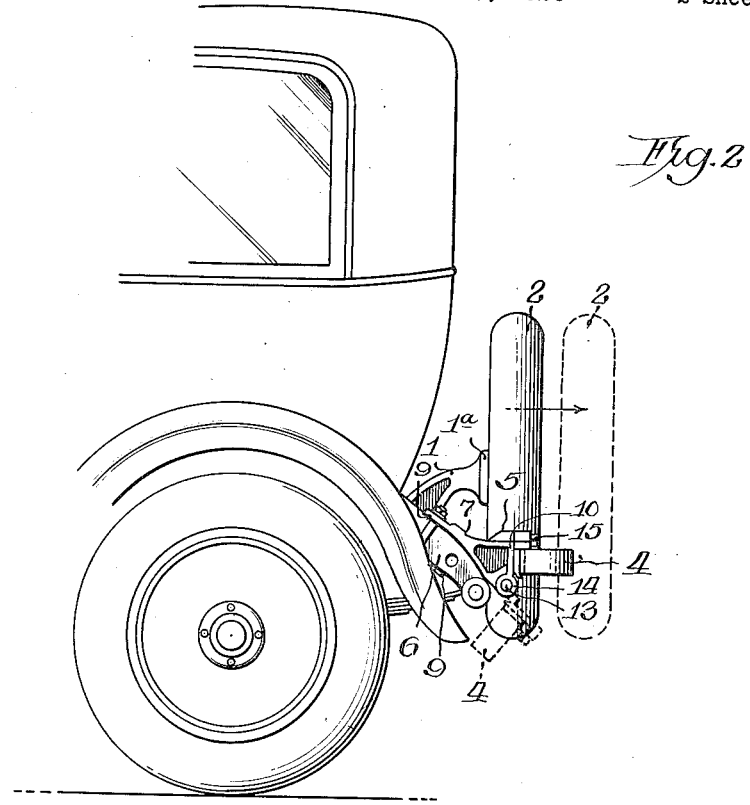
Figure 2 is a view in side elevation of the vehicle illustrating the bumper in the normal and dropped positions.
Figure 3:
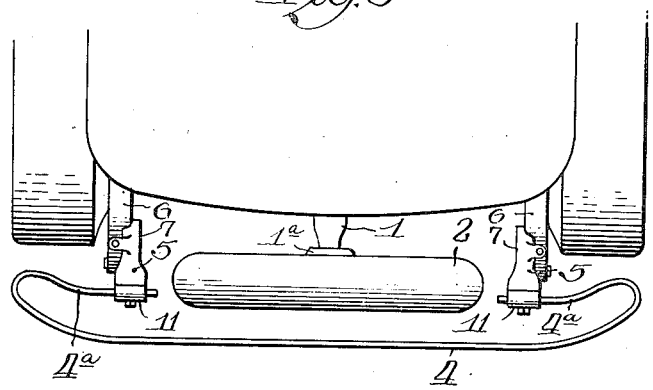
Figure 3 is a top plan view of the rear part of a vehicle showing the relative positions of the body, wheel and bumper.

A standard design of motor vehicle has been illustrated to show a common form of spare wheel mounting, consisting of a bracket 1, projecting from the rear of the vehicle frame and supporting a spare wheel 2 upon a spindle or hub 1$^a$ and secured in place by cap screws 3 (Figure 1) which screw into a suitable plate against which the central part of the wheel is held. A typical form of bumper 4 consists of a bar of spring steel bent in U-shape at its ends to form inwardly and rearwardly disposed end portions 4$^a$—4$^a$ which are secured in the brackets 5—5 mounted at the rear ends of the vehicle frame members 6—6 and located on either side of the spare wheel 2.

The brackets 5—5 are castings designed to be clamped, bolted or otherwise firmly secured to the rear end portions of the frame members 6—6. The particular method of attachment is not important, but for the purpose of illustration each bracket 5 consists of a body portion 7 which conforms to the top face of the frame member and is clamped directly to the rear end thereof by suitable fastening members.

A preferred bracket construction is disclosed in Figure 4, in which the body portion 7 consists of a web 8 reinforced by marginal webs 9 and adapted to be secured flat-wise against the frame member. At the end of the body portion is in integral abutment plate 10 extending transversely of said body web 8. This plate or web 10 is so positioned with respect to the body portion 7 as to extend vertically and face rearwardly when the bracket is attached to the frame member 6. Hinged to the lower edge of the abutment plate 10 is a clamping member 11 consisting of inverted U-shaped webs connected together at their upper ends, with a space or slot between, opening downwardly. Formed integral with the inner web of the clamping member is a bearing sleeve 12 journalled on a hinge pin 13 supported in bearing collars 14 integral with the body 7 of the bracket and located on either side of the sleeve 12.

In normal position the clamping member 11 is secured in flat-wise contact with the abutment plate, by means of a cap screw 15 extending through the upper part of the clamping member above the slot and anchored in the face of the abutment plate. Near the lower edge of the clamping member is another screw 16 which clamps the end portions 4ª of the bumper within the slot and thus connecting the bumper at each end directly to the clamping member.

As clearly shown in Figs. 1 and 2, the bumper in normal position extends across the lower portion of the spare wheel 2 and a short distance rearwardly of it. Assuming, therefore, that in order to remove the wheel the same must be shifted to the dotted line position in Fig. 2, it is obvious that the space between the wheel and the bumper is not sufficient to permit the required movement. By the use and manipulation of the bracket herein described, the bumper can be dropped out of the way by removing the cap screw 15 of each bracket thus allowing the entire bumper with the clamping members to swing downwardly below the wheel into the positions shown in dotted lines Figs. 1, 2 and 4, the swinging movement being about the hinge pins 13. In this way the wheel can be readily removed without trouble, the bumper being simply swung out of the way temporarily and swung back and locked in place after the wheel or tire change has been made.

For convenience the upper cap screws 15 of the clamps are made of the same size as the screws 3 which secure the wheel 2 on its carrier 1, so that the same tool can be used for loosening all screws or nuts which have to be removed in making the tire or wheel change.

As heretofore pointed out the use of a bracket of this character, and the advantages noted, are present in the same degree where spare tires are carried instead of spare wheels, the important feature being a bracket that will permit the bumper to be adjusted without disturbing its permanent connections or attachment to the vehicle.

While I have illustrated and described one particular embodiment of my invention, it will be understood that I do not wish to be limited to the exact construction shown and described, but that various changes and modifications may be made without departing from the spirit and scope of my invention.

I claim as my invention:

1. A bumper bracket comprising a body member adapted for attachment to a vehicle frame member and having a portion extending horizontally beyond said frame member, and a bumper attaching member having hinge connection with the end of said body member and normally secured against movement relative thereto.

2. A bumper bracket comprising a body member adapted for permanent attachment to a vehicle frame and having an extended end portion beyond said frame, a bumper attaching member having hinged connection at the end of said body member and normally secured in abutting engagement therewith, and means for releasing said bumper attaching member to permit the bumper to be swung about the end of said body member.

3. A bumper bracket comprising a body member provided with an upright abutment plate, a bumper engaging member, hinged to said body member and adapted for flat-wise contact with said abutment plate, and a locking member for normally locking said bumper engaging member against said abutment plate.

4. A bumper bracket comprising a body member adapted to be fixed to the vehicle frame and having a horizontally extending portion terminating in a vertical abutment plate, a bumper attaching member having hinged connection with said body member adjacent a horizontal edge of said plate and normally having flatwise contact therewith, and a removable locking member connecting said bumper attaching member and said plate.

5. A bumper bracket comprising a body member having an integral plate forming an abutment face, a clamping member hinged at one edge of said plate and normally having abutting contact therewith, and a removable locking member connecting said clamping member to said body member.

6. A bumper bracket comprising a body member having an integral abutment plate, a clamping member adapted to be secured to a bumper, and having hinged connection adjacent the bottom edge of said abutment plate and normally positioned in flatwise abutting contact therewith and a screw passing through said clamping member and anchored in said body member adjacent the top of said plate.

7. A bumper bracket comprising a body member having an abutment plate, adapted to be positioned vertically, a clamping member hinged adjacent one edge of said abutment plate and bearing flatwise thereagainst, a locking member normally holding said clamping member against said plate, and adapted to be removed to permit the latter to be swung away from said abutment plate.

Signed at Chicago this 24th day of June, 1924.

WILLIAM J. GROTENHUIS.